United States Patent Office 3,332,436
Patented July 25, 1967

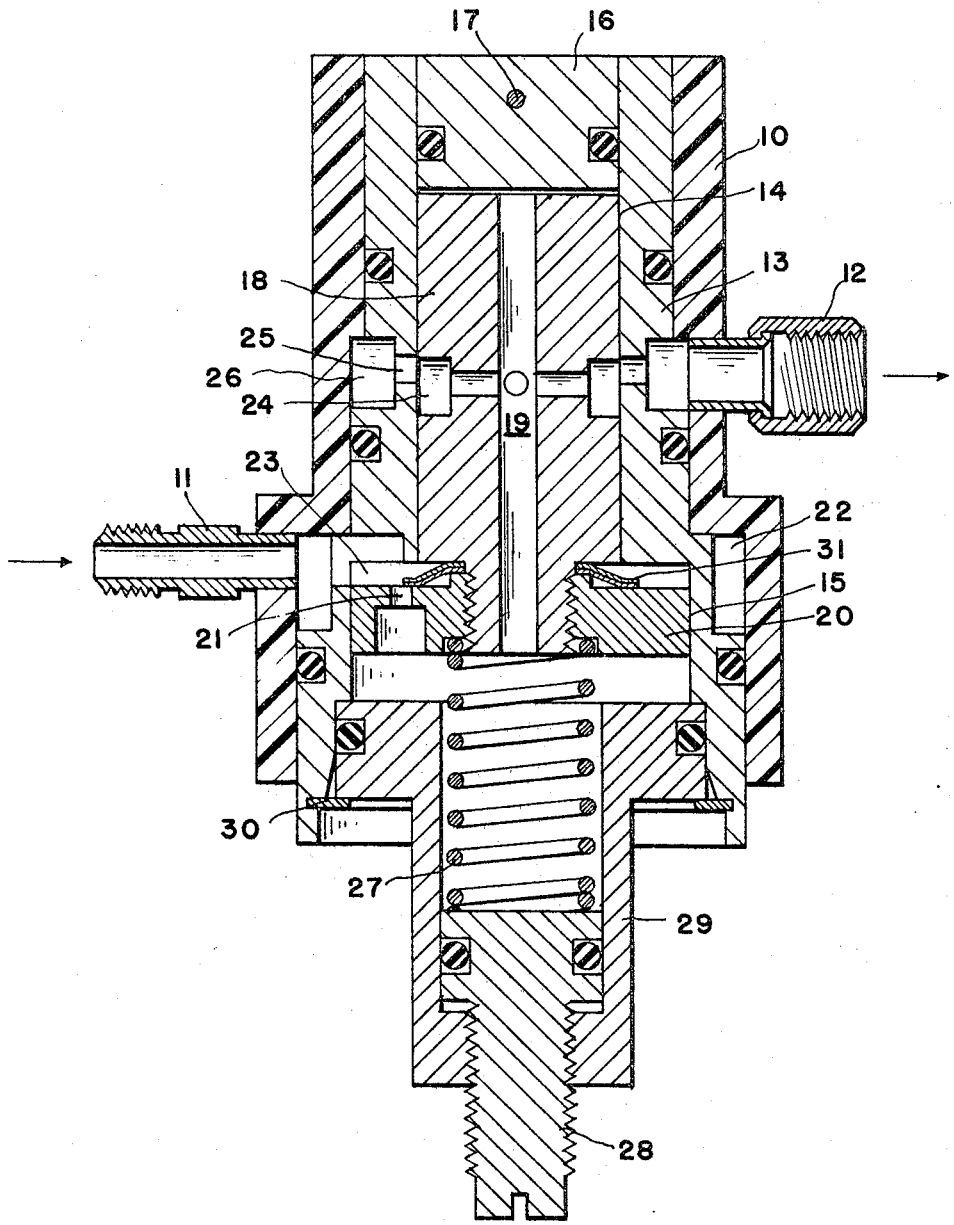

3,332,436
TEMPERATURE AND PRESSURE COMPENSATED LIQUID FLOW CONTROL
Frank Welty, Youngstown, Ohio, assignor to The Vendo Company, Kansas City, Mo., a corporation of Missouri
Filed Apr. 5, 1965, Ser. No. 445,535
6 Claims. (Cl. 137—468)

This invention relates to an improved device for controlling the rate of flow of a liquid regardless of variations in the source pressure of the liquid, and more particularly to a simplified arrangement in such a device whereby adequate compensation is made for variations in the temperature of the liquid. The contemplated use of the apparatus of the invention is the control of flow of liquids, such as soft drink flavoring syrups, which become more viscous with a drop in temperature and because of such increased viscosity adversely affects the compensation otherwise built into the control device for variations in source pressure.

The primary object of the invention is the provision of a device for the purposes above stated which is simple in design, inexpensive to construct, readily reconstructed for handling different liquids, and readily disassembled and reassembled for inspection and cleaning as is required in the maintenance of equipment for dispensing liquids for human consumption.

Another object of the invention is the provision of a device having the characteristics above outlined and for the purposes stated which is sensitive in operation, stable in adjustment, and which is inherently balanced in its operation so that the device remains accurately operative regardless of the downstream back pressure applied to it.

The above and other objects and advantages of the invention will become apparent upon consideration of the following specification and the accompanying drawing wherein there is disclosed a preferred embodiment of the invention.

The sole figure of the drawing is a longitudinal section of a control device embodying the principles of the invention.

In the drawing, reference numeral 10 designates a tubular outer housing provided in its side wall with an inlet fitting 11 and an outlet fitting 12. Received within the housing 10 is a tubular body member 13 having a bore 14 of a first diameter and an axially adjacent bore 15 of a larger diameter. Closing off the free end of the bore 14 is a plug 16 which may be held in position by a pin 17 and, as shown in the drawing, various O-ring seals are employed about the plug as well as between the body member 13 and the housing 10 to prevent leakage.

Slideably received in the bore 14 of body member 13 is a valving plunger 18 having a thru-bore 19 and being necked down and screw-threaded at its lower end. Screw-threadedly received on the lower end of plunger 18 is a piston 20 which slides within the bore 15 of the body member 13. Piston 20 is provided with an axially directed short, sharp orifice 21, the function of which will be described below. It should be noted that the body member 13 is relieved to form an annular space 22 which is in communication with the inlet fitting 11 and, further, that this annular space 22 is connected with an open space 23 at the top of piston 20 which is at the inlet of the orifice 21.

The valving plunger 18 has an annular recess 24 in its outer periphery which is in communication with the bore 19 by means of the radial holes shown in the plunger 18. This recess 24 is transversely aligned with radial ports 25 formed in the side wall of body member 13 leading to an annual space 26 formed in the outer periphery of this body member. This annual space 26 communicates openly with the outlet fitting 12.

It will thus be seen that the upper end wall or edge of the annular space 24 cooperating with the radial ports 25 constitutes a modulating valve operated by sliding movement of the plunger 18. When this plunger is in its upper-most position, the valve is fully open but as the plunger is progressively moved downwardly the valve is correspondingly progressively closed off.

To bias the piston 20 and valving plunger 18 to upper position, I provide an expansion spring 27 which bears at its upper end against the bottom of the piston 20 and which bears at its bottom end on an adjustment screw 28, screw-threadedly received in a bottom cap 29. As shown, this cap closes off the bottom end of the body member 13, being detachably secured in place by a split spring ring 30.

Clamped between the shoulder on the plunger 18 and an annular boss on the piston 15 is the inner peripheral portion of a bi-metallic disk 31, the outer peripheral edge of which overlies a portion, approximately half, of the orifice 21. The layers of different metals of the disk 31 are so related that when the disk is warm its outer peripheral edge portion overlies the top surface of the piston 20 in contact therewith. As the disk cools off its outer peripheral edge portion rises above this surface and, in effect, thus progressively enlarges the orifice 21. While I have shown this disk-type of control to vary the effective size of the orifice in accordance with changes in temperature of the incoming liquid, it should be understood that various other arrangements and thermostatic devices can be readily devised to accomplish this function. The structure illustrated and described, however, is advantageous because of its simplicity, low cost, and ease of revision but it should be appreciated that the gist of the invention lies in the concept of varying the effective size of the orifice in accordance with temperature changes, whatever the specific mechanical apparatus is used for this purpose.

Considering now the operation of the device illustrated and described above, it should be kept in mind, first, that the pressure drop across a given orifice is a function of the rate of flow of the liquid through the orifice. This is so because more of the potential energy of the liquid under pressure at the inlet end of the orifice is converted to kinetic energy in the rapidly moving liquid at the outlet end of the orifice. In this device the open space below the orifice as well as the size of the passages 19, 24–26 and outlet 12 in relation to the size of the orifice 21 is such that the kinetic energy of the liquid discharging from the orifice is effectively dissipated and has no dynamic effect of the operation of the valve. Before proceeding further, it should also be noted that any downstream back pressure which may be applied to the device is effectively balanced, as far as the plunger 18 is concerned, by the fact that this pressure is applied to both ends of the plunger. In fact, the only unbalancing force which is applied to the plunger in opposition to the force exerted by the spring 28 is that resulting from the fluid pressure acting against the annular outer peripheral portion of the piston 20 which is outside the circular projection of the plunger.

Assuming that the dispensing faucet (not shown) or other passage connected with the outlet 12 is closed off and that liquid under pressure is applied to the inlet 11, it will be obvious that there is no pressure drop across the opposite sides of the piston 20. In this condition the spring 27 will act to hold the plunger 18 in upper position with the valve 24, 25 full open. Now, as and when liquid starts to flow through the device and the orifice 21, a pressure drop will develop across the orifice to move the piston and valve plunger downwardly thereby throttling the valve. If the rate of flow is too great as indicated by an excess pressure drop across the orifice, the piston will move down and further throttle the flow at 24, 25 until a balance is reached, after which the device will continue to pass the quantity of liquid for which it is designed. Assuming now that the incoming liquid becomes colder and more viscous while its pressure remains the same, it will be obvious that the increased impedance to flow through the orifice 21 will result in the application of a larger total force acting on the upper side of the piston 20 in opposition to the spring 27, causing the latter to be further compressed and further throttling the valve 24, 25. In this condition the rate of flow through the device would ordinarily be too low. However, the lower temperature of the incoming liquid causes the lip of the disk 31 to rise permitting a greater rate of flow through the orifice 21 while decreasing the pressure drop across the orifice due to its increase in physical size. This permits the spring 21 to raise the plunger 18 to further open the valve 24, 25 thereby permitting more liquid to flow. During normal operation of the device a balance is reached at which the thermostatic element 31 so effectively controls the size of the orifice 21 in relation to the temperature of the incoming liquid that a precise rate of flow is maintained.

The device of this invention is highly useful in proportioning the flow of flavoring syrups in relation to a controlled flow of plain or carbonated water in the preparation of soft drinks. The syrups are highly concentrated as to sugar and/or flavor and the mixing proportions must be precise to produce a uniform drink. Since the highly sugared syrups vary greatly in viscosity with temperature, extreme difficulty has heretofore been encountered in controlling their rates of flow. In the practical application of the device herein illustrated and described the size of the orifice 21 is, of course, selected not only in regard to the nature of the liquid to be controlled but also in regard to the normal flow capacity of the equipment which will be connected to the outlet 12. Likewise, the sensitivity of the thermostatic control 31 will be selected with regard to the nature of the liquid to be controlled.

It should be noted that the illustrated and described construction as herein disclosed makes it extremely easy to disassemble the device for inspection and cleaning and to rapidly change the piston 20 and disk 31 to achieve different characteristics. The inner parts of the device are made readily accessible simply by removing the spring ring 30 and, of course, the outer housing 10 may simply be forcibly slid off the body member 13. By having a series of disks 31 of different curvature or bias and a series of pistons 20 having orifices of different size, it is readily possible to select suitable components for giving any desired operating characteristics.

Having thus described my invention what I claim is:

1. In a flow-control device having a throttling valve operated by a sliding element, said device having a cylinder portion with a piston slideable therein connected with said element for actuating the latter, spring means acting on the assembly of said piston and element to bias the same in one direction, an axial orifice through said piston, passage means through said device for liquid flow therethrough comprising said orifice and said throttling valve in series whereby said piston and element assembly is urged to movement against said spring means by the pressure drop across said orifice, and means carried with said piston to effectively vary the size of said orifice in response to variations in temperature of the liquid coming into said device.

2. A device according to claim 1 further characterized in that said means to vary the effective area of said orifice comprises a bi-metallic disk having its center portion rigidly connected to said piston and having its outer peripheral edge portion overlying a portion of said orifice.

3. A device according to claim 1 further including a body member having a bore therein and said element comprising a plunger slideably received in said bore, means closing off one end of said bore, the other end of said bore being open to said cylinder portion housing said piston, and said passage means including an axial thru-opening in said plunger and piston whereby the liquid pressure at the outlet end of said orifice is balanced against opposite ends of said plunger.

4. A pressure and temperature compensated liquid flow-control device comprising a body member having a bore therein which is closed at one end and open at its other end, said body member also having a cylinder portion of larger diameter than said bore at the open end of said bore and axially aligned therewith, a plunger slideably received in said bore and having an axial liquid passage therethrough as well as valving ports in its outer periphery intermediate its ends communicating with said passage, cooperating valving ports in the side wall of said bore communicating with an outlet passage, a piston rigidly connected with said plunger and slideable in said cylinder portion, said piston having an axial orifice therethrough, an annular inlet port at the open end of said bore and providing a space for incoming liquid on one side of said piston, temperature responsive means carried by the piston and plunger assembly and housed within said space to vary the effective area of said orifice whereby said assembly will be urged in one direction with a force which is a function of the pressure and temperature of the incoming liquid, and yielding means to exert a control force on said assembly in the opposite direction.

5. A device according to claim 4 further characterized in that an end portion of said plunger is of reduced diameter and screw-threaded, said piston being screw threaded onto said end portion of said plunger, and said temperature responsive means being a bi-metallic ring which has its inner peripheral portion clamped between a peripheral inner portion of said piston and the shoulder on said plunger, the outer peripheral portion of said bi-metallic ring overlying a portion of the inlet area of said orifice.

6. A device according to claim 4 further including a cap member closing off said cylinder portion outwardly of the piston, quick-detachable means securing said cap member in position, said cap member having a centrally disposed cylindrical portion, said yielding means comprising an expansion coil spring housed in said cylindrical portion and bearing at one end on the side of said piston opposite said space, and an adjusting screw screw-threadedly received in the outer end wall of said cap member bearing against the opposite end of said coil spring.

No references cited.

WILLIAM F. O'DEA, *Primary Examiner.*

H. W. WEAKLEY, *Assistant Examiner.*